US009121995B2

(12) United States Patent
Tanigawa et al.

(10) Patent No.: US 9,121,995 B2
(45) Date of Patent: Sep. 1, 2015

(54) OPTICAL FIBER HAVING HOLES

(75) Inventors: Shoji Tanigawa, Sakura (JP); Katsuhiro Takenaga, Sakura (JP); Shoichiro Matsuo, Sakura (JP); Takashi Matsui, Musashino (JP); Taiji Sakamoto, Musashino (JP); Kyouzou Tsujikawa, Musashino (JP); Shigeru Tomita, Musashino (JP)

(73) Assignees: FUJIKURA LTD., Tokyo (JP); NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 13/559,207

(22) Filed: Jul. 26, 2012

(65) Prior Publication Data
US 2012/0288247 A1 Nov. 15, 2012

Related U.S. Application Data

(63) Continuation of application No. PCT/JP2011/051524, filed on Jan. 26, 2011.

(30) Foreign Application Priority Data

Jan. 27, 2010 (JP) ................................. 2010-015819

(51) Int. Cl.
*G02B 6/036* (2006.01)
*G02B 6/032* (2006.01)
*G02B 6/02* (2006.01)

(52) U.S. Cl.
CPC ........ *G02B 6/02347* (2013.01); *G02B 6/03627* (2013.01); *G02B 6/02333* (2013.01)

(58) Field of Classification Search
CPC ........... G02B 6/02347; G02B 6/02352; G02B 6/02357; G02B 6/02361; G02B 6/02366; G02B 6/02371; G02B 6/0238; G02B 6/02333
USPC ................................................. 385/123–128
See application file for complete search history.

(56) References Cited

U.S. PATENT DOCUMENTS

| 6,526,209 | B1 | 2/2003 | Hasegawa et al. |
| 2001/0028775 | A1 | 10/2001 | Hasegawa et al. |
| 2001/0031118 | A1 | 10/2001 | Hasegawa et al. |

(Continued)

FOREIGN PATENT DOCUMENTS

| CN | 1564035 A | 1/2005 |
| JP | 2001-235649 A | 8/2001 |

(Continued)

OTHER PUBLICATIONS

T. Kato et al., "Ultra-low nonlinearity low-loss pure silica core fibre for long-haul WDM transmission", Electronic Letters, vol. 35, No. 19 pp. 1615-1617, Sep. 1999.

(Continued)

*Primary Examiner* — Omar R Rojas
(74) *Attorney, Agent, or Firm* — Sughrue Mion, PLLC

(57) ABSTRACT

Each of a first clad region (12) and a second clad region (13) has holes (12a, 13a) which have identical diameters and are periodically formed so that the first clad region (12) and the second clad region (13) each have an effective refractive index lower than a refractive index of a core region (11), the effective refractive index of the first clad region (12) being lower than that of the second clad region (13).

4 Claims, 9 Drawing Sheets

(56) References Cited

U.S. PATENT DOCUMENTS

| | | | |
|---|---|---|---|
| 2001/0038740 A1 | 11/2001 | Hasegawa et al. | |
| 2004/0170437 A1 | 9/2004 | Hasegawa et al. | |
| 2006/0034574 A1* | 2/2006 | Guan et al. | 385/125 |
| 2008/0310806 A1 | 12/2008 | Mukasa | |
| 2010/0135628 A1 | 6/2010 | Mukasa | |

FOREIGN PATENT DOCUMENTS

| | | |
|---|---|---|
| JP | 2003-255153 A | 9/2003 |
| JP | 2008-310034 A | 12/2008 |
| JP | 2010-14893 A | 1/2010 |
| WO | 01/63328 A1 | 8/2001 |

OTHER PUBLICATIONS

T. Matsui et al., "Study on enlargement of effective area of photonic crystal fiber" The Institute of Electronics, Information and Communication Engineers (IEICE) Society Conference 2008, pp. 275, Sep. 2008.

K. Mukasa et al., "Comparison of merits on wide-band transmission systems between Using extremely improved solid SMFs with Aeff of 160μm$^2$ and loss of 0.175 dB/km and Using large-Aeff holey fibers enabling transmission over 600nm bandwidth", Proceedings of OFC2008, OthR1, Feb. 2008.

T. Sørensen et al., "Macro-bending loss properties of photonic crystal fibre", Electronic Letters, vol. 37, No. 5, pp. 287-289, Mar. 2001.

Office Action issued by the Japanese Patent Office in Japanese Application No. 2011-551884 dated Dec. 4, 2012.

T. Matsui et al., "Applicability of Photonic Crystal Fiber With Uniform Air-Hole Structure to High-Speed and Wide-Band Transmission Over Conventional Telecommunication Bands," Journal of Lightwave Technology, Dec. 1, 2009, vol. 27, No. 23, p. 5410-5416.

T. Kato et al., "Dispersion Shifted Fiber for WDM Transmission," IEICE Technical Report, OCS96-51 to 59, vol. 96 No. 335 (1996), p. 43-48.

Y. Tsuchida et al., "Low-Bending-Loss Single-Mode Holey Fibers with Large Mode Area," Proceedings of the 2006 IEICE General Conference, Electronics 1 (2006). C-3-86, p. 221.

K. Kaneshima et al., "Investigation of Confinement Losses in Octagonal Photonic Crystal Fibers," Proceedings of the 2005 IEICE Communications Society Conference (2005), B-13-5, p. 364.

Chinese Office Action corresponding to Chinese Patent Application No. 201180006999.5, dated Dec. 4, 2013.

Japanese Office Action corresponding to Japanese Patent Application No. 2011-551884, dated Sep. 10, 2013. language English translation.

* cited by examiner

F I G. 8
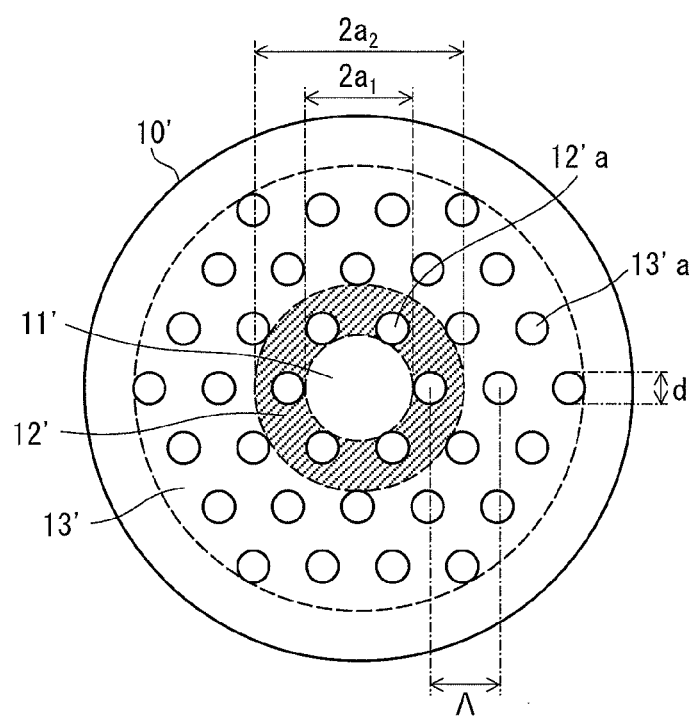

US 9,121,995 B2

OPTICAL FIBER HAVING HOLES

CROSS-REFERENCE TO RELATED APPLICATIONS

This application is a Continuation of PCT International Application Serial No. PCT/JP2011/051524 filed Jan. 26, 2011. This application is based upon and claims the benefits of priority from prior Japanese Patent Application No. 2010-015819 filed Jan. 27, 2010.

TECHNICAL FIELD

The present invention relates to an optical fiber, particularly relates to a photonic crystal fiber.

BACKGROUND ART

In an optical transmission system, it is important for an optical fiber, which is a transmission medium, to have an increased effective area so as to increase transmission quantity and a transmission distance. This is because the optical fiber having such an increased effective area can transmit intense optical signals without causing a decrease in transmission quality due to a nonlinear effect.

An example of the optical fiber having such an increased effective area is a single mode fiber, which is described in Non-Patent Literature 1. The single mode fiber described in Non-Patent Literature 1 employs a W-index refractive index profile (in which an inner part of a clad region has a refractive index lower than that of an outer part of the clad region). This allows the single mode fiber to have an increased effective area. Non-Patent Literature 1 describes that the single mode fiber employing the W-index refractive index profile can increase its effective area up to 150 µm². An optical fiber employed in a long-distance transmission system such as a core network or a submarine system mainly employs the single mode fiber whose effective area is increased by employing the W-index refractive index profile.

However, there is limitation on increase in effective area of a single mode fiber, such as the single mode fiber described in Non-Patent Literature 1, in which the inner part of the clad region has a refractive index different from that of the outer part of the clad region by a dopant being added to the clad region. It has been therefore considered to employ a photonic crystal fiber having a further increased effective area, instead of the single mode fiber. What is meant by "photonic crystal fiber" is an optical fiber in which a clad region has a refractive index different from that of a core region by holes being formed in the clad region.

FIG. 11 illustrates a configuration of a conventional photonic crystal fiber 20 (see Non-Patent Literature 4). (a) of FIG. 11 is a cross-sectional view illustrating a cross-sectional structure of the photonic crystal fiber 20. (b) of FIG. 11 is a graph showing an effective refractive index profile of the photonic crystal fiber 20.

The photonic crystal fiber 20 has a clad region 22 in which holes 22a are periodically arranged (see (a) of FIG. 11). This allows the clad region 22 to have an effective refractive index lower than a refractive index of a core region 21 (see (b) of FIG. 11). The core region 21 and the clad region 22 are made from an identical material (for example, pure silica glass), and a refractive index difference between the core region 21 and the clad region 22 is derived from the holes 22a. Note that a difference between the refractive index of the core region 21 and the effective refractive index of the clad region 22 is hereinafter referred to as "a refractive index difference between the core region 21 and the clad region 22" in the specification.

Light is confined in the photonic crystal fiber 20 due to total reflection which is caused by the refractive index difference between the core region 21 and the clad region 22. Therefore, the photonic crystal fiber 20 can be called a "photonic crystal fiber of refractive index waveguide type". By calling the photonic crystal fiber 20 as above, the photonic crystal fiber 20 is distinguished from a "photonic crystal fiber of photonic band gap type" that confines light by use of a photonic band gap.

Non-Patent Literature 2 describes a photonic crystal fiber which (i) can perform a single mode transmission as with a single mode fiber and (ii) has a bending loss property identical to that of the single mode fiber. The photonic crystal fiber can increase its effective area up to 157 µm². Non-Patent Literature 3 describes a single mode fiber whose effective area can be increased up to 160 µm² by optimizing its optical property.

CITATION LIST

Non-Patent Literature

Non-Patent Literature 1
T. Kato et al, "Ultra-low nonlinearity low-loss pure silica core fiber for long-haul WDM transmission", Electronic Letters, vol. 35, no. 19, pp. 1615-1617, September 1999.

Non-Patent Literature 2
Matsui et al, "Study on enlargement of effective area of photonic crystal fiber", The Institute of Electronics, Information and Communication Engineers (IEICE) Society Conference 2008, pp. 275, September 2008.

Non-Patent Literature 3
K. Mukasa et al, "Comparisons of merits on wide-band transmission systems between using extremely improved solid SMFs with Aeff of µm² and loss of 0.175 dB/km and using large-Aeff holey fibers enabling transmission over 600 nm bandwidth", Proceedings of OFC2008, OthR1, February 2008.

Non-Patent Literature 4
T. Sorensen et al, "Macro-bending loss properties of photonic crystal fiber", Electronic Letters, vol. 37, no. 5, pp. 387-289, March 2001.

SUMMARY OF INVENTION

Technical Problem

However, each effective area of a conventional single mode fiber and a conventional photonic crystal fiber is not more than 160 µm². This prevents a further increase in transmission quality and transmission distance.

The conventional single mode fiber employs a configuration in which an inner part of a clad region has a refractive index different from that of an outer part of the clad region by a dopant being added to the clad region. It is therefore difficult for the conventional single mode fiber to have an effective area of greater than 160 µm².

The conventional photonic crystal fiber can have an effective area of greater than 160 µm² by being configured such that a diameter of holes formed in an inner part of a clad region is greater than that of holes formed in an outer part of the clad region. It is, however, extremely difficult to produce such a photonic crystal fiber. This is because it is remarkably difficult to produce the photonic crystal fiber from a base material by fiber draw in such a manner that an optimized ratio of (i) the diameter of the holes formed in the inner part of the clad region to (ii) the diameter of the holes formed in the outer part of the clad region becomes a predetermined value.

The present invention was made in view of the problem, and an object of the present invention is to provide an optical fiber which (i) has a greater effective area and (ii) is more easily produced as compared with the conventional photonic crystal fiber, while (a) being capable of carrying out a single mode transmission and (b) having a small bending loss as with the conventional photonic crystal fiber.

Solution to Problem

In order to attain the object, an optical fiber of the present invention is an optical fiber, having a cross sectional configuration having a core region, a first clad region arranged around the core region, and a second clad region arranged around the first clad region, each of the first clad region and the second clad region having holes which have identical diameters and are periodically formed so that the first clad region and the second clad region each have an effective refractive index lower than a refractive index of the core region, and the effective refractive index of the first clad region being lower than that of the second clad region.

According to the configuration, the clad regions (the first clad region and the second clad region), in each of which the holes are periodically formed, are arranged around the core region. This causes the optical fiber to confine light by means of total reflection, as with a conventional photonic crystal fiber. Therefore, the optical fiber can (i) carry out a single mode transmission at a broader wavelength band and (ii) have a small bending loss, as with the conventional photonic crystal fiber. The optical fiber can also have an effective area greater than that of the conventional photonic crystal fiber having a step-index effective refractive index profile (see (b) of FIG. 11) since the effective refractive index of the first clad region is lower than that of the second clad region in the optical fiber of the present invention.

Further, according to the configuration, the holes of the first clad region are identical in diameter to those of the second clad region. Therefore, the optical fiber can be easily produced as compared with an optical fiber whose effective area is increased by forming holes in a first clad region so as to have a diameter different from that of holes formed in a second clad region.

Therefore, according to the configuration, it is possible to provide an optical fiber which (i) has a greater effective area and (ii) can be more easily produced as compared with the conventional photonic crystal fiber, while (a) being capable of carrying out a single mode transmission and (b) having a small bending loss as with the conventional photonic crystal fiber.

Note that what is meant by "holes . . . being periodically formed" is that the holes are arranged periodically enough for the optical fiber, in which the holes are formed, to function as a photonic crystal fiber. Note also that what is meant by the holes of the first clad region being "identical" in diameter to those of the second clad region is that a diameter difference between the holes of the first clad region and the holes of the second clad region is smaller than a manufacturing tolerance.

In the optical fiber of the present invention, the effective refractive index of the first clad region can be decreased more than that of the second clad region by, for example, (1) increasing a number density of the holes of the first clad region more than that of the holes of the second clad region, (2) adding a dopant to the first clad region so as to decrease the effective refractive index of the first clad region, or (3) employing (1) and (2) in combination. In a case where the effective refractive index of the first clad region is decreased more than that of the second clad region by increasing the number density of the holes of the first clad region more than that of the holes of the second clad region, the optical fiber can have a lower loss. This is because it is unnecessary to add any dopant so as to make a refractive index difference between the first clad region and the second clad region, and therefore no loss is caused by scattering of a dopant.

In order to attain the object, an optical fiber of the present invention is an optical fiber, having a cross sectional configuration having a core region, a first clad region arranged around the core region, and a second clad region arranged around the first clad region, the first clad region and the second clad region having first holes and second holes, respectively, formed periodically so that first and second effective refractive indices of the respective first and second clad regions are lower than a refractive index of the core region, and a first occupied ratio of the first holes to a cross-sectional area of the first clad region being higher than a second occupied ratio of the second holes to a cross-sectional area of the second clad region so that the first clad region has an effective refractive index lower than that of the second clad region.

According to the configuration, the clad regions (the first clad region and the second clad region), in which the respective first and second holes are periodically formed, are arranged around the core region. This causes the optical fiber to confine light by means of total reflection, as with a conventional photonic crystal fiber. Therefore, the optical fiber can (i) carry out a single mode transmission at a broader wavelength band and (ii) have a small bending loss, as with the conventional photonic crystal fiber. The optical fiber can also have an effective area greater than that of the conventional photonic crystal fiber having a step-index effective refractive index profile since the effective refractive index of the first clad region is lower than that of the second clad region in the optical fiber of the present invention.

Further, according to the configuration, the first occupied ratio of the first holes to the cross-sectional area of the first clad region is higher than the second occupied ratio of the second holes to the cross-sectional area of the second clad region so that the first clad region has the effective refractive index lower than that of the second clad region. It is therefore unnecessary to form the holes in the first clad region so as to have a diameter different from that of the holes formed in the second clad region so that the effective refractive index of the first clad region is lower than that of the second clad region. Hence, the optical fiber of the present invention can be produced more easily than an optical fiber in which holes are formed in a first clad region so as to have a diameter different from that of holes formed in a second clad region so that an effective refractive index of the first clad region becomes lower than that of the second clad region.

According to the configuration, it is therefore possible to provide an optical fiber which (i) has a greater effective area and (ii) can be more easily produced as compared with the conventional photonic crystal fiber, while (a) being capable of carrying out a single mode transmission and (b) having a small bending loss as with the conventional photonic crystal fiber.

Advantageous Effects of Invention

According to the present invention, it is possible to provide an optical fiber which (i) has a greater effective area and (ii) can be more easily produced as compared with a conventional photonic crystal fiber, while (a) being capable of carrying out a single mode transmission and (b) having a small bending loss as with the conventional photonic crystal fiber.

Figure 1:
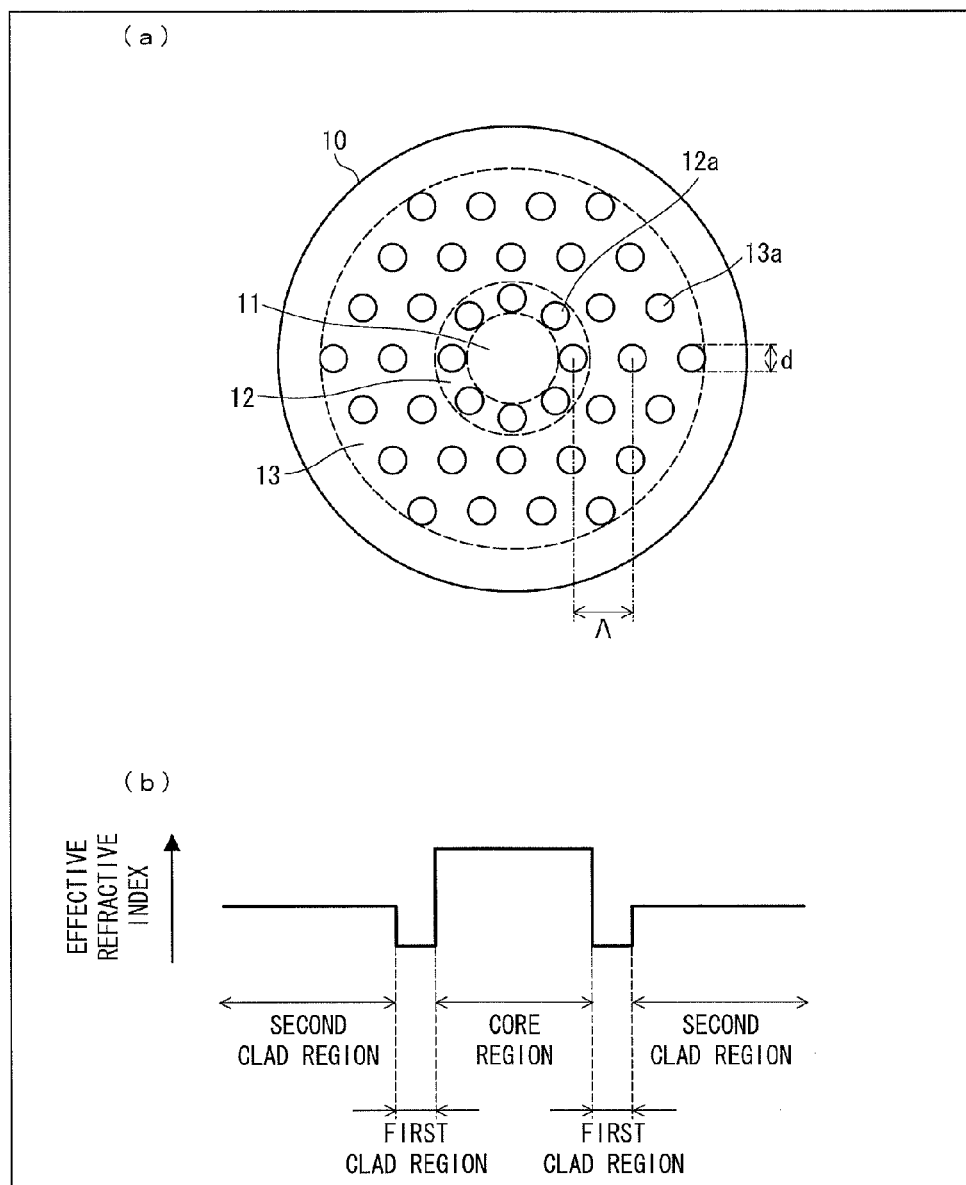
FIG. 1

(a) of FIG. 1 is a cross-sectional view illustrating a configuration of an optical fiber in accordance with Embodiment 1 of the present invention. (b) of FIG. 1 is a graph showing an effective refractive index profile of the optical fiber.

FIG. 2

Figure 2:
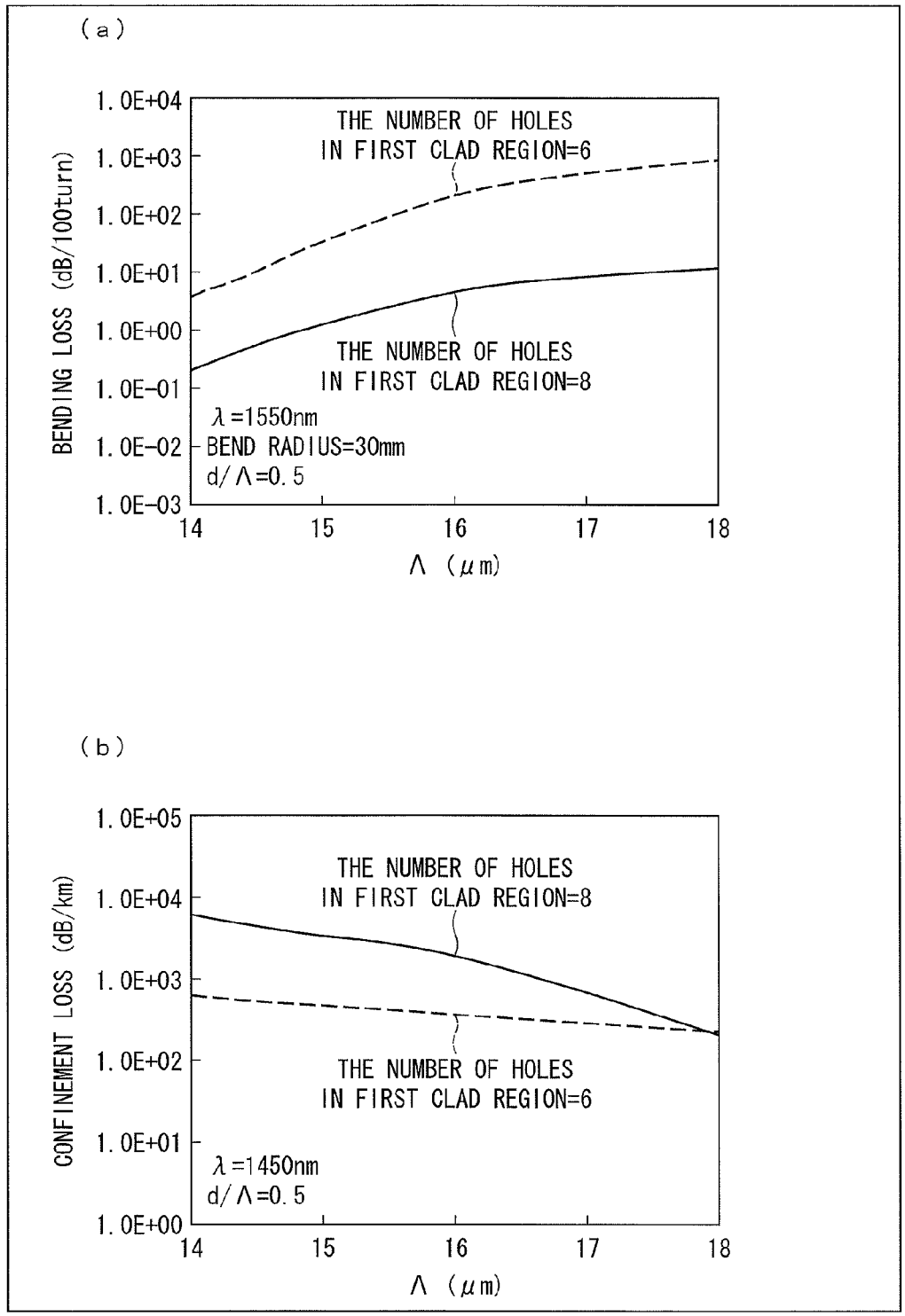

(a) of FIG. 2 is a graph showing (i) a bending loss property (indicated by a solid line) of the optical fiber in accordance with Embodiment 1 of the present invention and (ii) a bending loss property (indicated by a dashed line) of a conventional photonic crystal fiber. (b) of FIG. 2 is a graph showing (I) a confinement loss property (indicated by a solid line) of a higher order mode of the optical fiber in accordance with Embodiment 1 of the present invention and (II) a confinement loss property (indicated by a dashed line) of a higher order mode of the conventional photonic crystal fiber.

FIG. 3

Figure 3:
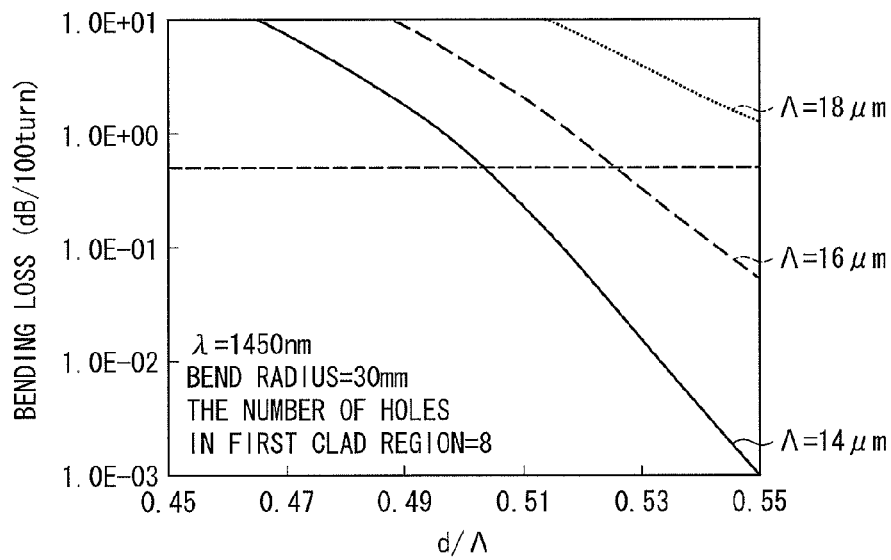

FIG. 3 is a graph showing a bending loss property of a fundamental mode of the optical fiber in accordance with Embodiment 1 of the present invention.

FIG. 4

Figure 4:
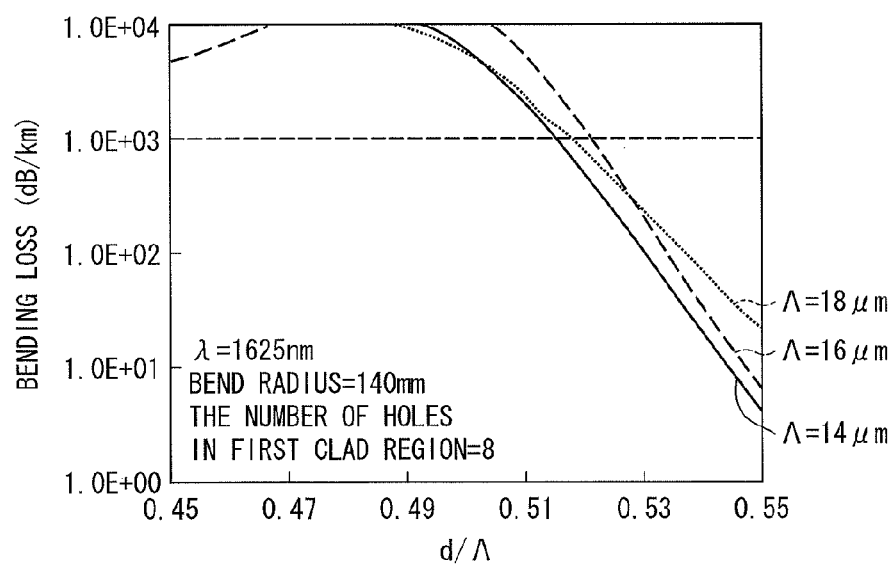

FIG. 4 is a graph showing a bending loss property of a higher order mode of the optical fiber in accordance with Embodiment 1 of the present invention.

FIG. 5

Figure 5:
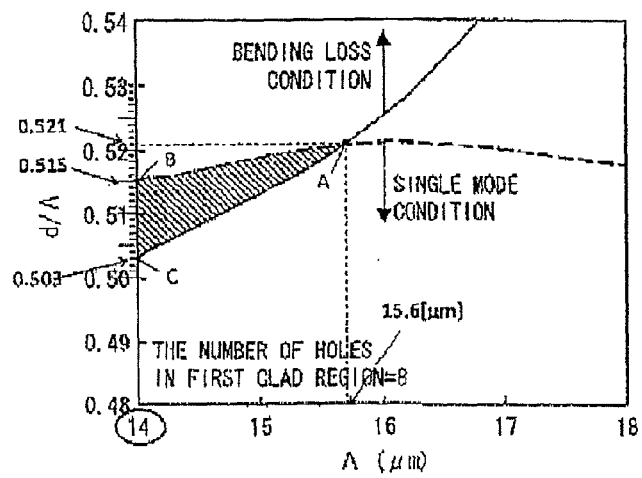

FIG. 5 is a characteristic diagram showing (i) a range of a hole diameter d and hole intervals Λ, which range meets a bending loss condition of the optical fiber in accordance with Embodiment 1 of the present invention and (ii) a range of a hole diameter d and hole intervals Λ, which range meets a single mode condition of the optical fiber in accordance with Embodiment 1 of the present invention.

FIG. 6

Figure 6:
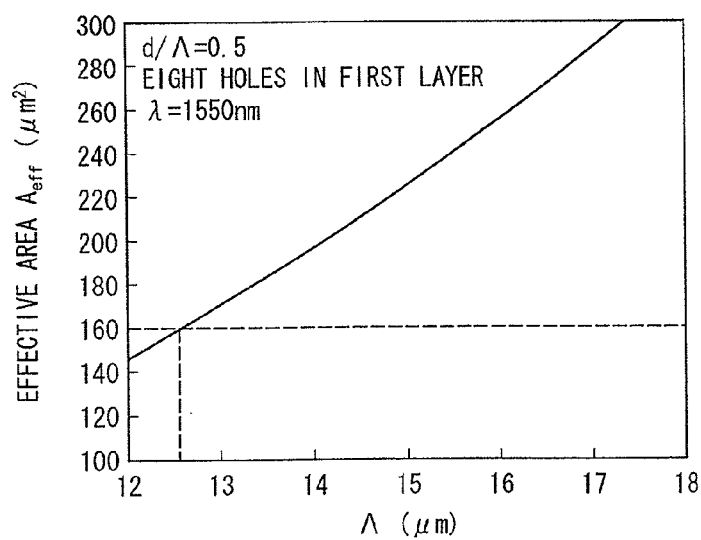

FIG. 6 is a graph showing a hole intervals dependency of an effective area of the optical fiber in accordance with Embodiment 1 of the present invention.

FIG. 7

Figure 7:
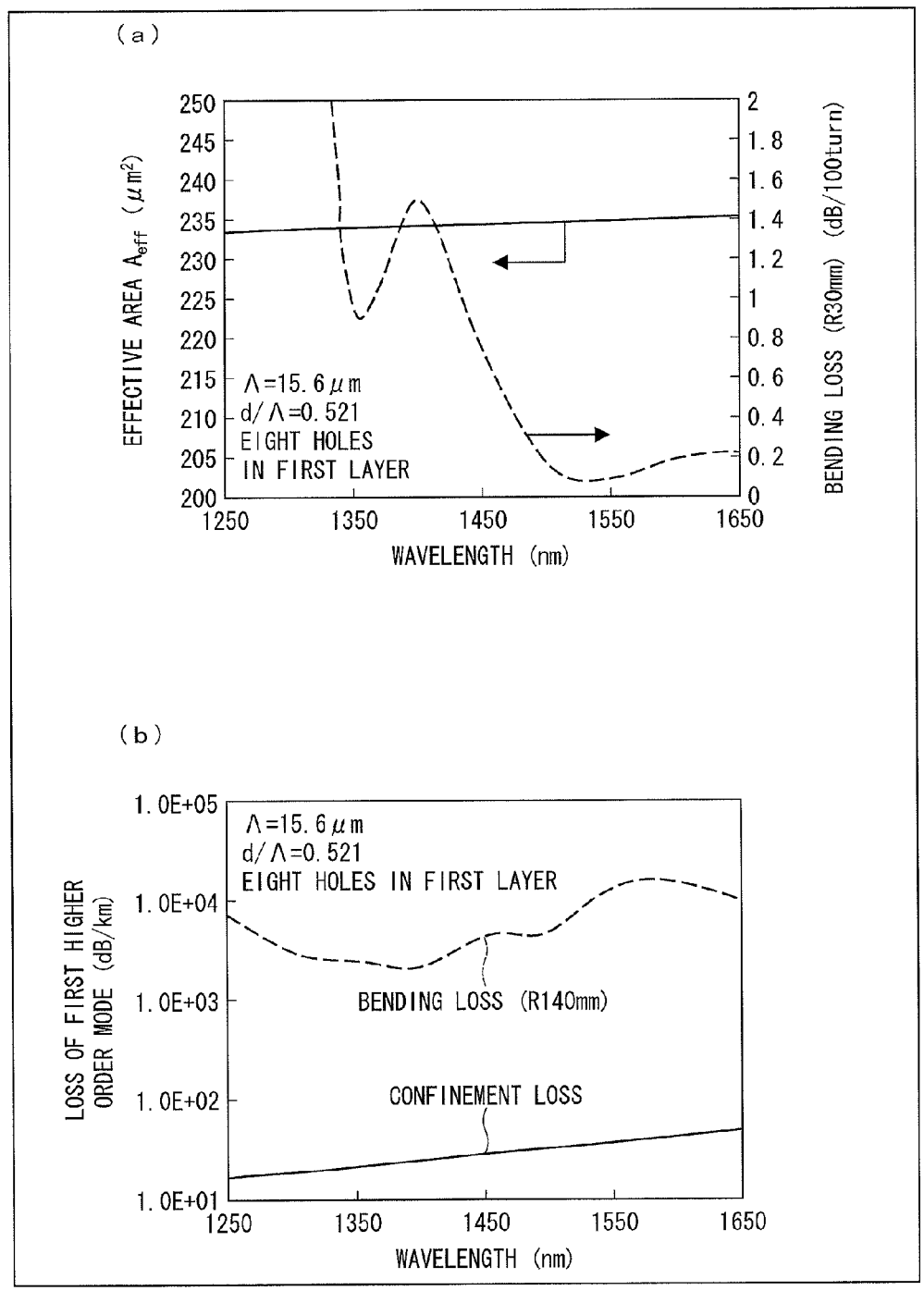

(a) of FIG. 7 is a graph showing a wavelength dependency of each of an effective area (indicated by a solid line) and a bending loss (indicated by a dashed line) of a fundamental mode of the optical fiber in accordance with Embodiment 1 of the present invention. (b) of FIG. 7 is a graph showing a wavelength dependency of each of a confinement loss (indicated by a solid line) and a bending loss (indicated by a dashed line) of a higher order mode of the optical fiber illustrated in FIG. 1.

FIG. 8

FIG. 8 is a cross-sectional view illustrating a configuration of an optical fiber in accordance with Embodiment 2 of the present invention.

FIG. 9

Figure 9:
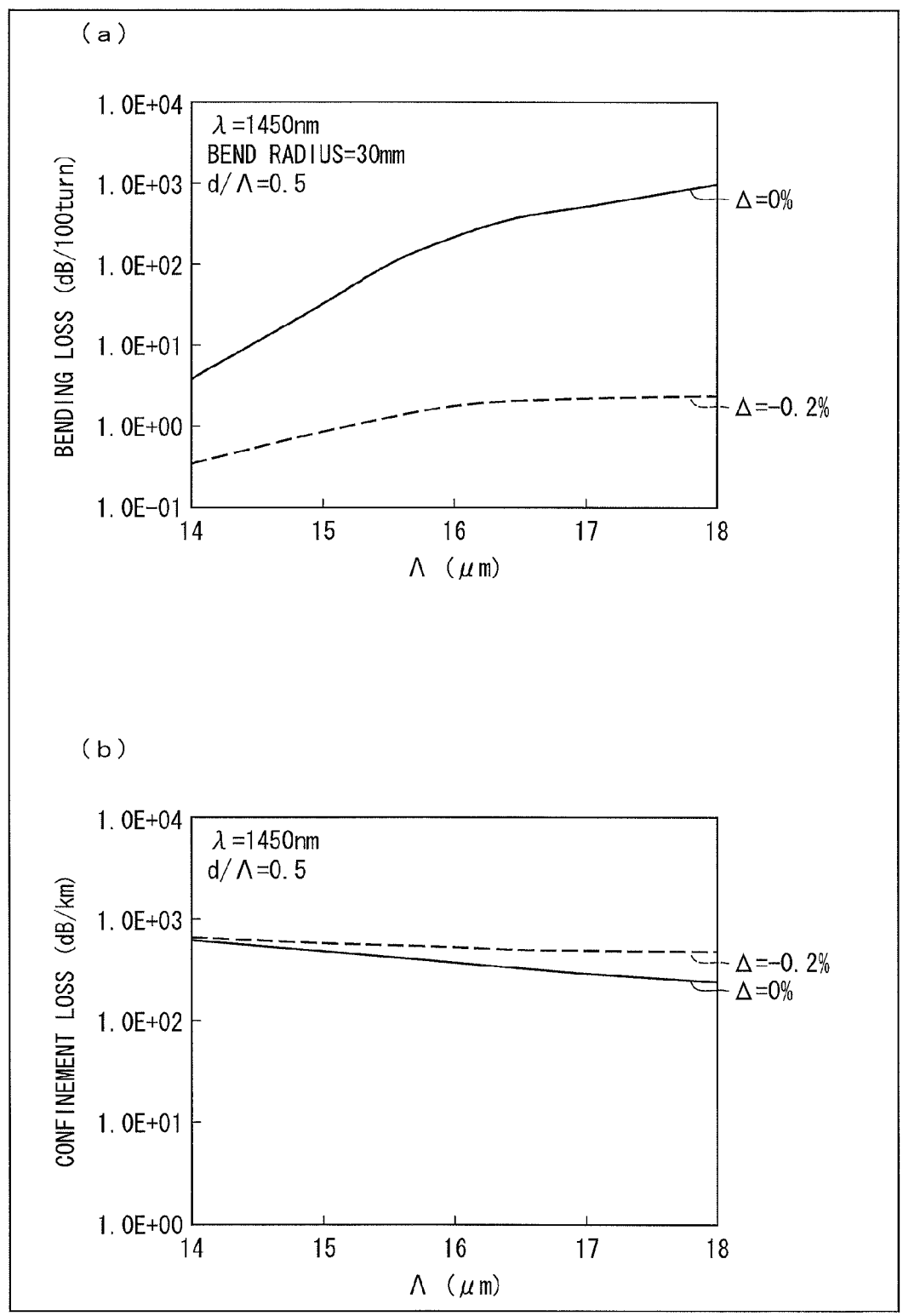

(a) of FIG. 9 is a graph showing (i) a bending loss property (indicated by a dashed line) of the optical fiber in accordance with Embodiment 2 of the present invention and (ii) a bending loss property (indicated by a solid line) of a conventional photonic crystal fiber. (b) of FIG. 9 is a graph showing (I) a confinement loss property (indicated by a dashed line) of a higher order mode of the optical fiber illustrated in FIG. 8, and (II) a confinement loss property (indicated by a solid line) of a higher order mode of the conventional photonic crystal fiber.

FIG. 10

Figure 10:
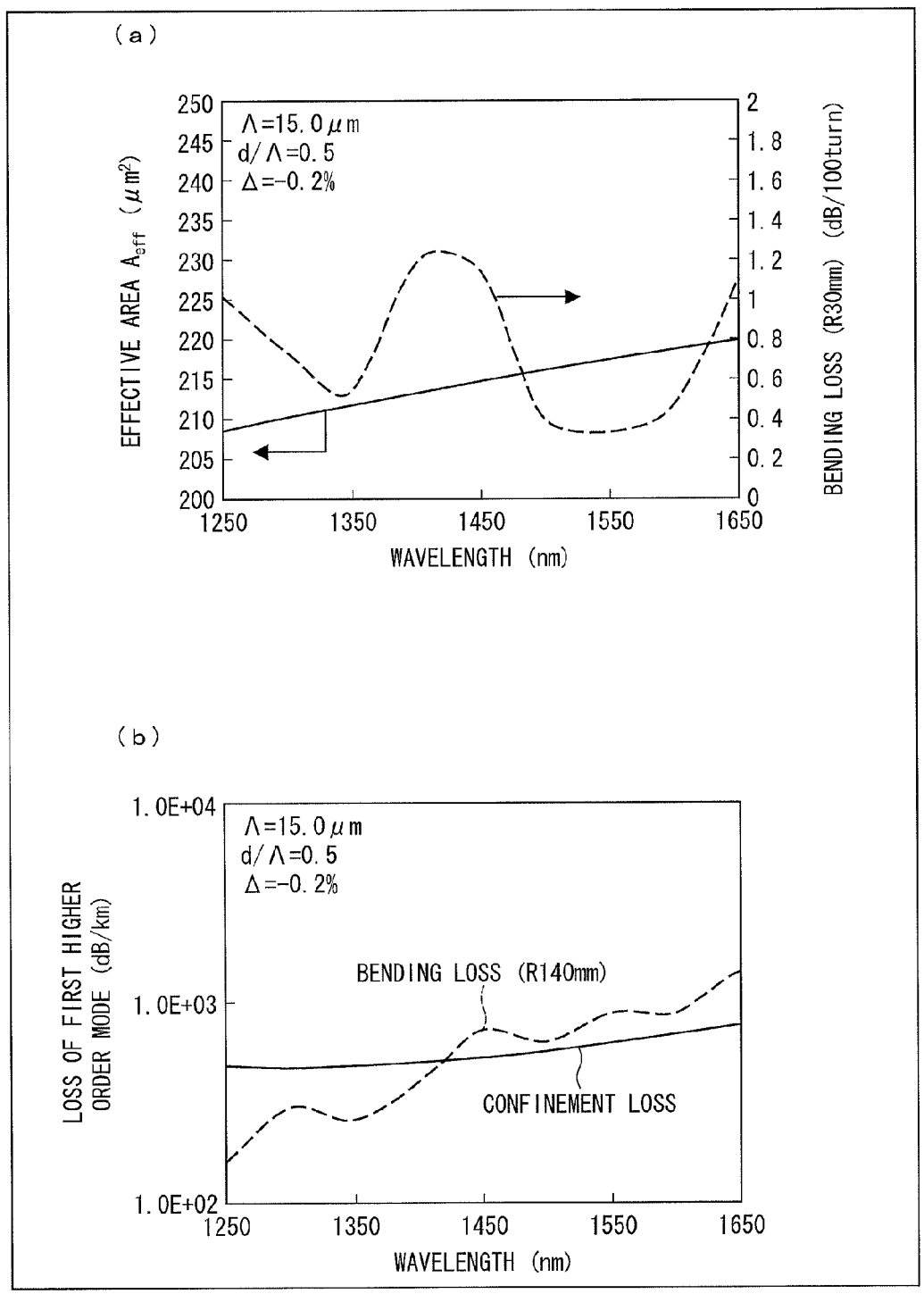

(a) of FIG. 10 is a graph showing a wavelength dependency of each of an effective area (indicated by a solid line) and a bending loss (indicated by a dashed line) of a fundamental mode of the optical fiber in accordance with Embodiment 2 of the present invention. (b) of FIG. 10 is a graph showing a wavelength dependency of each of a confinement loss (indicated by a solid line) and a bending loss (indicated by a dashed line) of a higher order mode of the optical fiber illustrated in FIG. 8.

FIG. 11

Figure 11:
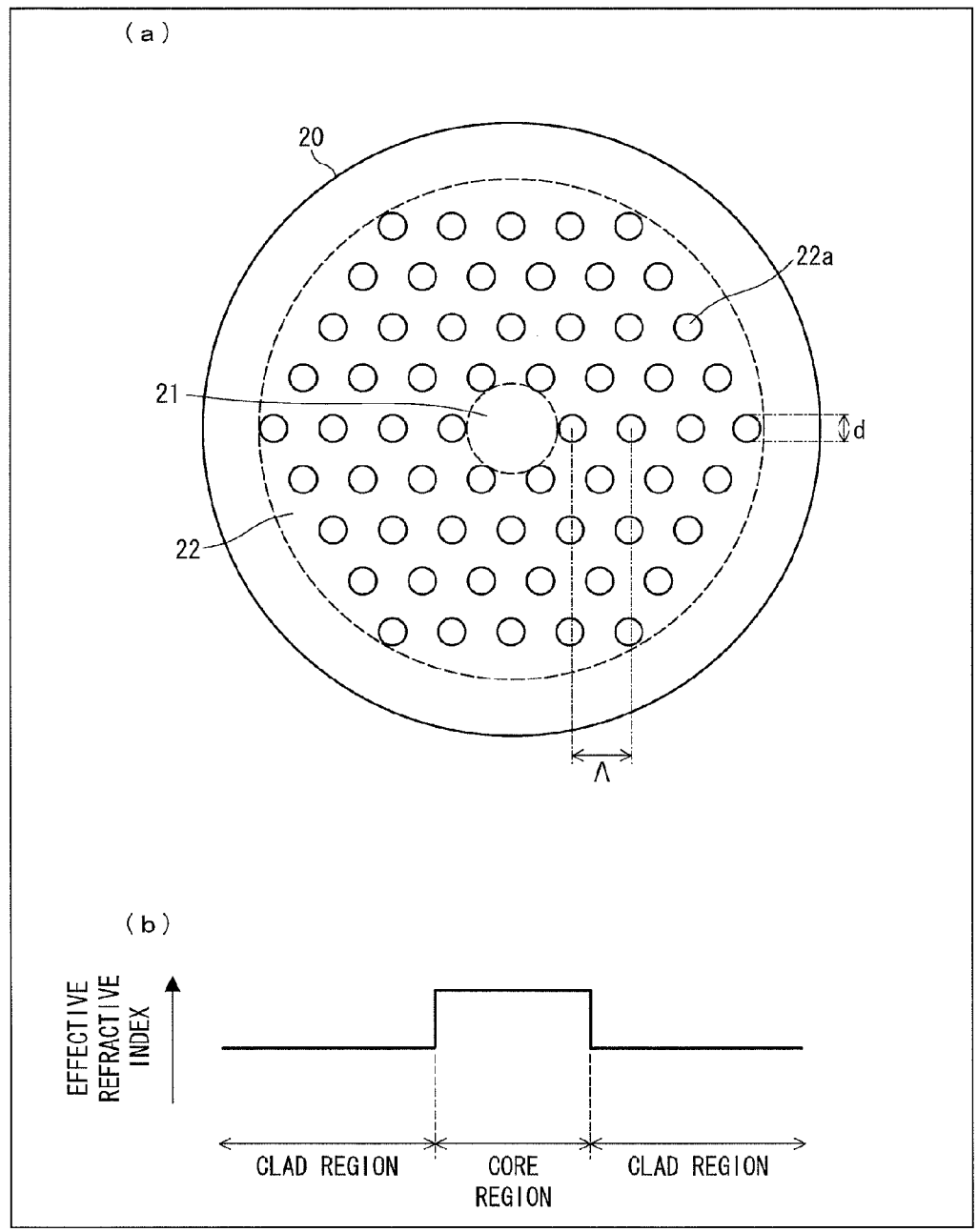

(a) of FIG. 11 is a cross-sectional view illustrating a configuration of a conventional photonic crystal fiber. (b) of FIG. 11 is a graph showing an effective refractive index profile of the conventional photonic crystal fiber.

DESCRIPTION OF EMBODIMENTS

[Embodiment 1]

The following description will discuss Embodiment 1 of the present invention with reference to FIGS. 1 through 7.

(Structure of Optical Fiber)

The following description will discuss a configuration of an optical fiber 10 in accordance with Embodiment 1, with reference to FIG. 1. (a) of FIG. 1 is a cross-sectional view illustrating a configuration of the optical fiber 10 in accordance with Embodiment 1. (b) of FIG. 1 is a graph showing an effective refractive index profile of the optical fiber 10 in accordance with Embodiment 1.

The optical fiber 10 has a cross sectional configuration in which (i) a core region 11 has a disk shape, (ii) a first clad region 12 has a ring shape that is arranged around the core region 11, and (iii) a second clad region 13 has a ring shape that is arranged around the first clad region 12 (see (a) of FIG. 1). The regions of the optical fiber 10 are made from respective identical materials (for example, pure silica glass).

The first clad region 12 and the second clad region 13 have holes 12a and holes 13a, which are periodically arranged, respectively. The holes 12a are identical in diameter to the holes 13a. Therefore, each effective refractive index of the first clad region 12 and the second clad region 13 is lower than a refractive index of the core region 11 which has no hole (see (b) of FIG. 1). This causes the optical fiber 10 to function as a photonic crystal fiber of refractive index waveguide type, as with a conventional photonic crystal fiber 20 illustrated in FIG. 11.

Furthermore, the first clad region has a number density of the holes 12a (the number of holes 12a per unit cross-sectional area) higher than that of the holes 13a in the second clad region 13 (see (a) of FIG. 1). Therefore, the effective refractive index of the first clad region 12 is lower than that of the second clad region 13 (see (b) of FIG. 1). This allows the optical fiber 10 to have a greater difference between the refractive index of the core region 11 and the effective refractive index of the first clad region 12 than that of the conventional photonic crystal fiber 20 illustrated in FIG. 11. Therefore, the optical fiber 10 can (i) carry out a single mode transmission and (ii) keep a characteristic of a photonic crystal fiber which characteristic permits a small bending loss, even in a case where a cross-sectional area (a diameter) of the core region 11 is increased so that the optical fiber 10 has an effective area greater than that of the conventional photonic crystal fiber 20 illustrated in FIG. 11.

Note that the first clad region 12 should be distinguished from the second clad region 13 because they have respective different effective refractive indices. According to Embodiment 1, although the first clad region 12 and the second clad region 13 are made from identical materials, they have respective different number densities of holes so as to have respective different effective refractive indices. This causes the first clad region 12 to be distinguished from the second clad region 13.

The following description will discuss in little more detail how holes are arranged in the optical fiber 10, with reference to (a) of FIG. 1.

Specifically, the first clad region 12 has M layered group(s) of holes, each of which M layered group(s) has 8×i holes 12a arranged on eight sides or eight apexes of a regular octagon in which a distance between a center and the respective eight apexes is Λ×i (i is a natural number of not less than 1 (one) but not more than M). (a) of FIG. 1 exemplifies a case where M=1, that is, a configuration in which the first clad region 12 has merely a single layered group of eight holes 12a in total arranged at respective eight apexes of a regular octagon in which a distance between a center and the respective eight apexes is Λ. Note, however, that M can be not less than 2 (two). In this case, a group of holes of the i-th (i≥2) layer of the first clad region 12 is generally made up of 8×i holes 12a in total arranged (i) at eight apexes of a regular octagon in which a distance between a center and the respective eight apexes is Λ×i and (ii) on 8×i points each obtained by dividing a corresponding one of the eight sides into i divisions.

The second clad region 13 has N layered group(s) of holes, each of which N layered group(s) has 6×j holes 13a arranged on a regular hexagon in which a distance between a center and the respective six apexes is Λ×j (j is a natural number of not less than M+1 but not more than M+N). (a) of FIG. 1 exemplifies a case where N=2, that is, a configuration where a group of holes of a second layer is provided so as to have twelve holes 13a in total. The twelve holes 13a are arranged (i) at six apexes of a regular hexagon in which a distance between a center and the respective six apexes is 2×Λ and (ii) on six middle points on the respective six sides of the regular hexagon. A group of holes of a third layer is further provided so as to have eighteen holes 13a in total. The eighteen holes 13a are arranged (I) at six apexes of a regular hexagon in which a distance between a center and the respective six apexes is 3×Λ and (II) on twelve points obtained by dividing six sides of the regular hexagon into three divisions. Note, however, that N can be 1 (one) or not less than 3 (three). Generally, a group of holes of the j-th (j≥2) layer of the second clad region 13 is provided so as to have 6×j holes 13a in total. The 6×j holes 13a are arranged (i) at six apexes of a regular hexagon in which a distance between a center and the respective six apexes is Λ×j and (ii) on 6×j points obtained by dividing six sides of the regular hexagon into j divisions. In the second clad region 13 in which the holes 13a are arranged as above, "Λ" represents hole intervals at which the holes 13a are arranged, that is, a center distance between respective adjacent holes 13a.

Note that how holes are arranged in each of the first clad region 12 and the second clad region 13 is not limited to the above-described concrete example, provided that the number density of the holes 12a of the first clad region 12 is higher than that of the holes 13a of the second clad region 13. For example, in a case where a second clad region 13 is configured so as to have N layered group(s) of holes, each of which N layered group(s) has 6×j holes 13a arranged on a regular hexagon in which a distance between a center and the respective six apexes is Λ×j, the first clad region 12 can be configured so as to have M layered group(s) of holes, each of which M layered group(s) has L×i holes 12a arranged on a regular polygon (with L sides) in which a distance between a center and the respective L apexes is Λ×i (L is a natural number of not less than 7 (seven)). In this case, the holes 12a and the holes 13a are isotropically arranged in the first clad region 12 and the second clad region 13, respectively. The holes 13a are arranged, in a close-packed manner, in the second clad region 13. Therefore, the holes 12a and the holes 13a can be stably formed.

Furthermore, a group of holes of each layer of the first clad region 12 can be arranged on a regular enneagon, a regular decagon, or a circumference, instead of a regular octagon, provided that the number density of the holes 12a of the first clad region 12 is higher than that of the holes 13a of the second clad region 13. A group of holes of each layer of the second clad region 13 can also be arranged on a regular pentagon, a regular tetragon (square), or a circumference, instead of a regular hexagon. Alternatively, the holes 12a and the holes 13a each can have a star shape or a kagome lattice shape in the first clad region 12 and the second clad region 13, respectively, provided that the number density of the holes 12a of the first clad region 12 is higher than that of the holes 13a of the second clad region 13.

The holes 12a and the holes 13a are arranged so that the number density of the holes 12a of the first clad region 12 is thus higher than that of the holes 13a of the second clad region 13. This causes an occupied ratio of the holes 12a to a cross-sectional area of the first clad region 12 to be higher than an occupied ratio of the holes 13a to a cross-sectional area of the second clad region 13. It is therefore possible that the first clad region 12 has an effective refractive index lower than that of the second clad region 13. In other words, it is possible to achieve the effective refractive index profile illustrated in (b) of FIG. 1, that is, a W-index effective refractive index profile in which (i) both the effective refractive index of the first clad region 12 and the effective refractive index of the second clad region 13 are lower than a refractive index of the core region 11 and (ii) the effective refractive index of the first clad region 12 is lower than that of the second clad region 13.

The following conclusion will be drawn from a comparison between (i) an optical fiber having a W-index refractive index profile (for example, a single mode fiber disclosed in Non-Patent Literature 1) and (ii) an optical fiber having a step-index refractive index profile, each of which optical fibers is an optical fiber in which a refractive index difference is made by addition of a dopant. Namely, the optical fiber having a W-index refractive index profile can have a cutoff wavelength and a bending loss which are equivalent to those of the optical fiber having the step-index refractive index profile, even in a case where a cross-sectional area of a core region of the optical fiber having the W-index refractive index profile is increased (a diameter of the core region is increased) so as to have an increased effective area. The following conclusion will be drawn from a comparison between (i) an optical fiber in which a refractive index difference is made by forming holes (for example, a photonic crystal fiber disclosed in Non-Patent Literature 2) and (ii) an optical fiber in which a refractive index difference is made by addition of fluorine, each of which optical fibers is an optical fiber having a step-index refractive index profile. Namely, the optical fiber in which the refractive index difference is made by forming the holes can have a cutoff wavelength and a bending loss which are equivalent to those of the optical fiber in which the refractive index difference is made by addition of fluorine, even in a case where a cross-sectional area of a core region of the optical fiber in which the refractive index difference is made by forming the holes is increased (a diameter of the core region is increased) so as to have an increased effective area. Therefore, the optical fiber 10 in accordance with Embodiment 1, which is an optical fiber having a W-index refractive index and a refractive index difference made by forming holes, can have an effective area greater than that of the single mode fiber described in Non-Patent Literature 1 and that of the photonic crystal fiber described in Non-Patent Literature 2 while having a cutoff wavelength and a bending loss equivalent to those of the single mode fiber described in Non-Patent Literature 1 and the photonic crystal fiber described in Non-Patent Literature 2.

Furthermore, in the optical fiber 10 in accordance with Embodiment 1, the first clad region 12 and the second clad region 13 are thus different from each other in number density of holes. This causes the optical fiber 10 to have W-index refractive index profile. As such, it is not necessary that (1) the holes 12a of the first clad region 12 have a diameter different from that of the holes 13a of the second clad region 13 so that the optical fiber 10 has an increased effective area and (2) a dopant be added to the first clad region 12 so as to decrease a refractive index of the first clad region 12. It is therefore possible to provide an optical fiber which (1) can be easily produced and (2) has a lower loss without any loss caused by scattering of the dopant.

(Characteristics of Optical Fiber)

The following description will discuss characteristics of the optical fiber 10 (see FIG. 1) in accordance with Embodiment 1, with reference to FIGS. 2 through 7.

(a) of FIG. 2 is a graph showing (i) a bending loss property (indicated by a solid line) of the optical fiber 10 in accordance with Embodiment 1 and (ii) a bending loss property (indicated by a dashed line) of a conventional photonic crystal fiber. Note that the graph of (a) of FIG. 2 shows results obtained by calculating bending losses generated when (I) a bend radius is 30 mm, (II) a wavelength λ is 1550 nm, and (III) a ratio d/Λ of a hole diameter d to hole intervals Λ at which the holes 12a are arranged is 0.5. Note that the conventional photonic crystal fiber which was used to be compared with the optical fiber 10 in accordance with Embodiment 1 has a configuration identical to that of the optical fiber 10, except that a first clad region 12 has six holes, i.e., except that the first clad region 12 has a number density of holes which is identical to that of a second clad region 13.

As is clear from (a) of FIG. 2, the optical fiber 10 of Embodiment 1 has a bending loss less than that of the conventional photonic crystal fiber. This is because the optical fiber 10 of Embodiment 1 employs the arrangement in which the number density of the holes of the first clad region 12 is higher than that of the holes of the second clad region 13.

(b) of FIG. 2 is a graph showing (i) a confinement loss property (indicated by a solid line) of a higher order mode (a first higher order mode or an LP 11 mode) in the optical fiber 10 and (ii) a confinement loss property (indicated by a dashed line) of a higher order mode (a first higher order mode or an LP 11 mode) in the conventional photonic crystal fiber. The graph of (b) of FIG. 2 shows results obtained by calculating confinement losses generated when a wavelength λ is 1450 nm, and a ratio d/Λ of a hole diameter d to hole intervals Λ at which the holes 12a are arranged is 0.5. Note that the conventional photonic crystal fiber that was used to be compared with the optical fiber 10 in accordance with Embodiment 1 has a configuration identical to that of the optical fiber 10, except that a first clad region 12 has six holes.

As is clear from (b) of FIG. 2, the optical fiber 10 of Embodiment 1 has a confinement loss of a higher order mode greater than that of the conventional photonic crystal fiber. This is because the optical fiber 10 of Embodiment 1 employs the arrangement in which the number density of the holes of the first clad region 12 is higher than that of the holes of the second clad region 13. Generally, as a confinement loss of a higher order mode in an optical fiber becomes greater, the higher order mode is more likely to be leaked outside the optical fiber. This causes the optical fiber to be more easily carry out a single mode transmission. It is therefore possible to provide an optical fiber in which the single mode transmission is more likely to be achieved, as compared with the conventional photonic crystal fiber, by employing the hole arrangement of the optical fiber 10 in accordance with Embodiment 1.

It should be noted that the cross-sectional area (diameter) of the core region 11 of the optical fiber 10, that is, the effective area is just slightly decreased as compared with the conventional photonic crystal fiber, even in a case where the number density of the holes of the first clad region 12 is increased. This is because the refractive index of the first clad region 12 can be effectively reduced. Therefore, the calculation results shown in FIG. 2 demonstrate that an increase in the number density of the holes of the first clad region 12 allows (i) a decrease in the bending loss of the optical fiber 10 and (ii) an increase in the confinement loss of the higher order mode in the optical fiber 10 without any decrease in the effective area. To put it another way, the calculation results shown in FIG. 2 demonstrate that the increase in the number density of the holes of the first clad region 12 allows an increase in the effective area without any increase in the bending loss of the optical fiber 10 and without any decrease in the confinement loss of the higher order mode in the optical fiber 10.

FIG. 3 is a graph showing a bending loss property of a fundamental mode of the optical fiber 10 in accordance with Embodiment 1. In the graph, a solid line, a dashed line, and a dotted line represent hole intervals Λ of 14 μm, 16 μm, and 18 μm, respectively. The solid line, the dashed line, and the dotted line are obtained by calculating bending losses generated when a bend radius is 30 mm and a wavelength λ is 1450 nm.

Note that the reason why results obtained by calculating bending losses generated when the wavelength λ of light to be transmitted is 1450 nm are shown is based on the following assumption. Namely, it is assumed to utilize an S through L bands (not less than 1460 nm but not more than 1625 nm), which bands have been in widespread use during long-distance light transmissions. A bending loss of a photonic crystal fiber is increased as a wavelength becomes shorter, which is disclosed in Non-Patent Literature 4. It therefore turns out that a bending loss generated in the S through L bands becomes not more than a bending loss calculated when the wavelength λ is 1450 nm.

As is clear from FIG. 3, in a case where the hole intervals Λ are constant, as the ratio d/Λ of the hole diameter d to the hole intervals Λ is increased (that is, as the hole diameter d is increased), the bending loss of the optical fiber 10 becomes less because a confinement effect of the fundamental mode of the optical fiber 10 is enhanced. For example, if the hole intervals Λ are not more than 14 μm, then a bending loss condition (in which a bending loss, generated when a bend radius is 30 mm, is not more than 0.5 dB per 100 wire turns), which ITU-T656 recommends, can be met for a wavelength of not less than 1450 nm by setting the ratio d/Λ to not less than 0.505. If the hole intervals Λ are not more than 16 μm, then the bending loss condition, which ITU-T656 recommends, can be met for the wavelength of not less than 1450 nm by setting the ratio d/Λ to not less than 0.525.

FIG. 4 is a graph showing a bending loss property of a higher order mode (a first higher order mode or an LP 11 mode) of the optical fiber 10 in accordance with Embodiment 1. In the graph, a solid line, a dashed line, and a dotted line represent hole intervals Λ of 14 μm, 16 μm, and 18 μm, respectively. The solid line, the dashed line, and the dotted line are obtained by calculating bending losses generated when a bend radius is 140 mm and a wavelength λ is 1625 nm.

As is clear from FIG. 4, in a case where the hole intervals Λ are constant, as the ratio d/Λ is decreased (that is, as the hole diameter d is decreased), the optical fiber 10 is more likely to carry out a single mode transmission because a confinement effect of the higher order mode of the optical fiber 10 is decreased. For example, if the hole intervals Λ are 14 μm, then a single mode condition (in which a bending loss, generated when a bend radius is 140 mm, is not less than 1 dB/m=$10^3$ dB/km), described in Non-Patent Literature 2, can be met for a wavelength of not more than 1625 nm by setting the ratio d/Λ to not more than 0.515. If the hole intervals Λ are 16 μm, then the single mode condition, described in Non-Patent Literature 2, can be met for the wavelength of not more than 1625 nm by setting the ratio d/Λ to not more than 0.52.

FIG. 5 is a characteristic diagram showing (i) a range of a hole diameter d and hole intervals Λ in the optical fiber 10 of Embodiment 1, which range meets the bending loss condition which ITU-T656 recommends and (ii) a range of a hole diameter d and hole intervals Λ, which range meets the single mode condition disclosed in Non-Patent Literature 2.

A region above a solid line of FIG. 5 is a region where the bending loss of the fundamental mode of the optical fiber 10 meets the bending loss condition (in which the bending loss, generated when the bend radius is 30 mm, is not more than 0.5 dB per 100 wire turns), which ITU-T656 recommends. A region below a dashed line of FIG. 5 is a region where the bending loss of the higher order mode of the optical fiber 10 meets the single mode condition (in which the bending loss, generated when the bend radius is 140 mm, is not less than 1 dB/m=$10^3$ dB/km), described in Non-Patent Literature 2. A shaded region of FIG. 5 is a region where the bending loss condition and the single mode condition are simultaneously met. At an intersecting point of the solid line and the dashed line, hole intervals Λ are 15.6 μm and a ratio d/Λ of a hole diameter d to the hole intervals Λ is 0.521.

As is clear from FIG. 5, (1) it is possible to provide an optical fiber that meets both the bending loss condition and the single mode condition by appropriately setting the hole diameter d in a case where the hole intervals Λ are not more than 15.6 μm, (2) it is possible to provide an optical fiber that meets both the bending loss condition and the single mode condition by appropriately setting the hole intervals Λ in a case where the ratio d/Λ of the hole diameter d to the hole intervals Λ is not more than 0.521, and (3) it is possible, by taking into consideration the cross-sectional area of the core region 11 being increased as the hole intervals Λ are increased, to provide an optical fiber, with a largest effective area, which meets both the bending loss condition and the single mode condition in a case where the hole intervals Λ is 15.6 μm and the ratio d/Λ is 0.521.

FIG. 6 is a graph showing a hole intervals dependency of an effective area of the optical fiber 10 in accordance with Embodiment 1. In the graph of FIG. 6, d/Λ is 0.5, and a wavelength λ is 1550 nm. An increase in hole intervals Λ causes an increase in cross-sectional area of a core region. Therefore, the increase in the hole intervals Λ causes an increase in the effective area of the optical fiber 10. As is clear from FIG. 6, in a case where the hole intervals Λ are not less than 12.6 μm, the optical fiber 10 can have an effective area of not less than 160 μm$^2$ which is the limit effective area of a conventional optical fiber. Therefore, as is clear from FIGS. 5 and 6, in a case where the hole intervals Λ are not less than 12.6 μm but not more than 15.6 μm, the optical fiber 10 can have an effective area greater than that of the conventional optical fiber while meeting both the bending loss condition and the single mode condition.

(a) of FIG. 7 is a graph showing a wavelength dependency of each of an effective area (indicated by a solid line) and a bending loss (indicated by a dashed line) of a fundamental mode of the optical fiber 10 in accordance with Embodiment 1. (a) of FIG. 7 shows results obtained by calculating the effective area and the bending loss of the optical fiber 10, with the largest effective area, which meets both the bending loss condition and the single mode condition, that is, the optical fiber 10 having the hole intervals Λ of 15.6 μm and the ratio d/Λ of 0.521.

As is clear from (a) of FIG. 7, the effective area of the optical fiber 10 is approximately 235 μm$^2$ when a wavelength λ is not less than 1250 nm but not more than 1650 nm. That is, by employing the optical fiber 10 of Embodiment 1, it is possible to provide an optical fiber having a remarkably large effective area that is (i) approximately three times as large as that (approximately 80 μm$^2$) of the conventional single mode fiber and (ii) approximately 1.5 times as large as that (approximately 157 μm$^2$) of the conventional photonic crystal fiber, when the wavelength is not less than 1250 nm but not more than 1650 nm. Further, as is clear from (a) of FIG. 7, the bending loss condition (in which the bending loss, generated when the bend radius is 30 mm, is not more than 0.5 dB per 100 wire turns), which ITU-T656 recommends, can be met in the S through L bands (in the wavelength band between not less than 1460 nm and not more than 1625 nm).

(b) of FIG. 7 is a graph showing a wavelength dependency of each of a confinement loss (indicated by a solid line) and a bending loss (indicated by a dashed line) of a higher order mode (a first higher order mode or an LP 11 mode) of the optical fiber 10 in accordance with Embodiment 1. (b) of FIG. 7 shows results obtained by calculating the confinement loss and the bending loss of the higher order mode of the optical fiber 10, with the largest effective area, which meets both the bending loss condition and the single mode condition, that is, the optical fiber 10 having the hole intervals Λ of 15.6 μm and the ratio d/Λ of 0.521.

As is clear from (b) of FIG. 7, the bending loss of the higher order mode of the optical fiber 10 (in a case where the bend radius is 140 nm) is approximately 10 dB/m=$10^3$ dB/km when the wavelength λ is not less than 1250 nm but not more than 1650 nm. That is, by employing the optical fiber 10 of Embodiment 1, it is possible to provide an optical fiber that meets the single mode condition (in which the bending loss, generated when the bend radius is 140 mm, is not less than 1 dB/m=$10^3$ dB/km), described in Non-Patent Literature 2, when the wavelength λ is not less than 1250 nm but not more than 1650 nm. Note that although the confinement loss of the higher order mode of the optical fiber 10 is as small as 0.01 dB/m=10 dB/km, the optical fiber 10 will never be blocked from carrying out the single mode transmission. This is because the bending loss of the higher order mode of the optical fiber 10 (in a case where the bend radius is 140 nm) is sufficiently great.

The above description has discussed the characteristics of the optical fiber 10 which is assumed to be used in the S through L bands. However, wavelengths at which the optical fiber 10 can be used are not limited to the S through L bands. The optical fiber 10 can therefore be used (the optical fiber 10 can carry out a single mode operation while meeting the bending loss condition) at a wavelength of not less than 1.0 μm but not more than 1.7 μm or at a broader range of wavelengths.

[Embodiment 2]

The following description will discuss Embodiment 2 of the present invention, with reference to FIGS. 8 through 10.

(Configuration of Optical Fiber)

The following description will discuss a configuration of an optical fiber 10' in accordance with Embodiment 2, with reference to FIG. 8. FIG. 8 is a cross-sectional view illustrating a configuration of the optical fiber 10' in accordance with Embodiment 2.

The optical fiber 10' has a cross sectional configuration in which (i) a core region 11' has a disk shape, (ii) a first clad region 12' has a ring shape that is arranged around the core region 11', and (iii) a second clad region 13' has a ring shape that is arranged around the first clad region' 12 (see FIG. 8). Regions other than the first clad region 12' of the optical fiber 10' are made from respective identical materials (for example, pure silica glass).

The first clad region 12' and the second clad region 13' have holes 12'a and holes 13'a, which are periodically arranged, respectively. The holes 12'a are identical in diameter to the holes 13'a. Therefore, each effective refractive index of the first clad region 12' and the second clad region' 13 is lower than a refractive index of the core region 11' which has no hole. This causes the optical fiber 10' to function as a photonic crystal fiber of refractive index waveguide type, as with a conventional photonic crystal fiber 20 illustrated in FIG. 11.

A dopant (an additive) is added to the first clad region 12'. Therefore, a first refractive index of a material from which the first clad region 12' is made (the first refractive index in which the holes 12'a are not taken into consideration) becomes lower than a second refractive index of a material from which the second clad region 13' is made (the second refractive index in which the holes 13'a are not taken into consideration). Consequently, the effective refractive index of the first clad region 12' (in which the holes 12'a are taken into consideration) becomes lower than that of the second clad region 13' (in which the holes 13'a are taken into consideration). This causes the optical fiber 10' to have an effective area greater than that of the conventional photonic crystal fiber 20 illustrated in FIG. 11. Note that examples of a dopant that decreases the first refractive index encompass fluorine and boron.

Note that the first clad region 12' should be distinguished from the second clad region 13' because they have respective different effective refractive indices. According to Embodiment 2, although the first clad region 12' is identical in number density of holes to the second clad region 13', they have respective different refractive indices by adding a dopant to the first clad region 12'. The first clad region 12' is thus distinguished from the second clad region 13' in terms of whether or not a dopant is added.

The optical fiber 10' is identical to the conventional photonic crystal fiber 20 (see FIG. 11) in hole arrangement. That is, the optical fiber 10' has N layered group(s) of holes, each of which N layered group(s) has 6×i holes 12'a (or 13'a) arranged on a regular hexagon in which a distance between a center and the respective six apexes is Λ×i (i is a natural number of not less than 1 (one) but not more than N). FIG. 8 exemplifies a case where M=3, that is, a configuration in which a group of holes of a first layer is provided so as to have six holes 12'a in total arranged at six apexes of a regular hexagon in which a distance between a center and the respective six apexes is Λ. A group of holes of a second layer is further provided so as to have twelve holes 13'a in total. The twelve holes 13'a are arranged (i) at six apexes of a regular hexagon in which a distance between a center and the respective six apexes is 2×Λ and (ii) on six middle points on the respective six sides of the regular hexagon. A group of hole of a third layer is further provided so as to have eighteen holes 13'a in total. The eighteen holes 13'a are arranged (I) at six apexes of a regular hexagon in which a distance between a center and the respective six apexes is 3×Λ and (II) on twelve points obtained by dividing six sides of the regular hexagon into three divisions. However, the hole arrangement is not limited to this. "N" can be 2 (two) or not less than 4 (four). Generally, a group of holes of the i-th (I≥2) layer is provided so as to have 6×i holes 12'a (or 13'a) in total. The 6×i holes 12'a (or 13'a) are arranged (i) at six apexes of a regular hexagon in which a distance between a center and the respective six apexes is Λ×i and (ii) on 6×i points obtained by dividing six sides of the regular hexagon into i divisions.

FIG. 8 exemplifies a configuration in which a dopant is added to a region including merely the group of the holes 12'a of the first layer from the core region 11'. Note, however, that Embodiment 2 is not limited to this. A dopant can be added to a region including a group(s) of holes up to the M-th layer (N−1≥M≥1) from the core region 11'. Further, FIG. 8 exemplifies a case where a dopant is added to a region including all the holes 12'a of the first clad region 12'. However, Embodiment 2 is not limited to this. For example, innermost holes 12'a or outermost holes 12'a of the first clad region 12' are arranged so as to bridge a boundary between (i) a region to which a dopant is added and (ii) a region to which no dopant is added.

Thus, by employing the configuration in which a dopant, such as fluorine or boron, is added to the first clad region 12', the first clad region 12' can have an effective refractive index lower than that of the second clad region 13' even in a case where the first clad region 12' is identical to the second clad region 13' in number density of holes. In other words, it is possible to provide an effective refractive index profile identical to that of the optical fiber 10 in accordance with Embodiment 1, that is, a W-index effective refractive index profile in which (i) both the effective refractive index of the first clad region 12' and the effective refractive index of the second clad region 13' are lower than the refractive index of the core region 11' and (ii) the effective refractive index of the first clad region 12' is lower than that of the second clad region 13'.

Embodiment 2 has discussed a configuration in which the first clad region 12' has the effective refractive index lower than that of the second clad region 13', by adding a dopant, such as fluorine or boron, to the first clad region 12' only. Note, however, that Embodiment 2 is not limited to this. A configuration can be employed in which the effective refractive index of the first clad region 12' is lower than that of the second clad region 13' by, for example, (i) adding dopants having different concentrations to the respective first and second clad regions 12' and 13' or (ii) adding different dopants to the respective first and second clad regions 12' and 13'.

(Characteristics of Optical Fiber)

The following description will discuss characteristics of the optical fiber 10' (see FIG. 8) in accordance with Embodiment 2, with reference to FIGS. 9 and 10.

(a) of FIG. 9 is a graph showing (i) a bending loss property (indicated by a dashed line) of the optical fiber 10' having a first clad region 12' to which fluorine is added so that a relative refractive index difference Λ becomes −0.2% and (ii) a bending loss property (indicated by a solid line) of a conventional photonic crystal fiber. The graph of (a) of FIG. 9 shows results obtained by calculating the bending losses generated when (I) a bend radius is 30 mm, (II) a wavelength λ is 1450 nm, and (III) a ratio d/Λ of a hole diameter d to hole intervals Λ is 0.5. Note that the conventional photonic crystal fiber which was used to be compared with the optical fiber 10' in accordance with Embodiment 2 is identical to the optical fiber 10' except that no dopant is added to a first clad region 12' of the conventional photonic crystal fiber (a relative refractive index difference Δ is 0%).

Note that the relative refractive index difference Δ is represented by (n2−n1)/n1 in percentage, where (i) n1 represents a refractive index of pure silica glass (material for the core region 11') and (ii) n2 represents a refractive index of quartz (material for the first clad region 12') to which fluorine is added.

As is clear from (a) of FIG. 9, the optical fiber 10', having the first clad region 12' to which fluorine is added, has a bending loss smaller than that of the conventional photonic crystal fiber.

(b) of FIG. 9 is a graph showing (i) a confinement loss property (indicated by a dashed line) of a higher order mode (a first higher order mode or an LP 11 mode) of the optical fiber 10' having a first clad region 12' to which fluorine is added so that a relative refractive index difference Δ becomes −0.2% and (ii) a confinement loss property (indicated by a solid line) of the higher order mode (the first higher order mode or the LP 11 mode) of the conventional photonic crystal fiber. The graph of (b) of FIG. 9 shows results obtained by calculating the confinement losses generated when (I) a wavelength λ is 1450 nm and (II) the ratio d/Λ is 0.5. Note that the conventional photonic crystal fiber that was used to be compared with the optical fiber 10' in accordance with Embodiment 2 is identical to the optical fiber 10' except that no dopant is added to a first clad region 12' of the conventional photonic crystal fiber.

As is clear from (b) of FIG. 9, the optical fiber 10', having the first clad region 12' to which fluorine is added, has a confinement loss of the higher order mode greater than that of the conventional photonic crystal fiber, that is, the optical fiber 10', having the first clad region 12' to which fluorine is added, can easily carry out a single mode transmission.

(a) of FIG. 10 is a graph showing a wavelength dependency of each of an effective area (indicated by a solid line) and a bending loss (indicated by a dashed line) of a fundamental mode of the optical fiber 10' having a first clad region 12' to which fluorine is added so that a relative refractive index difference Δ becomes −0.2%. The graph of (a) of FIG. 10 shows results obtained by calculating the effective area and the bending loss generated when (I) hole intervals Λ is 15.0 μm and (II) a ratio d/Λ of a hole diameter d to hole intervals Λ is 0.5.

As is clear from (a) of FIG. 10, the optical fiber 10' has an effective area of approximately 220 μm$^2$ when a wavelength λ is 1550 nm. That is, by adding fluorine to the first clad region 12' so that the relative refractive index difference Δ becomes −0.2%, it is possible to provide an optical fiber having a great effective area that is (i) approximately 2.7 times as great as that (approximately 80 μm$^2$) of a conventional SMF and (ii) approximately 1.4 times as great as that (approximately 157 μm$^2$) of the conventional photonic crystal fiber when, for example, the wavelength λ is 1550 nm. Further, as is clear from (a) of FIG. 10, it is possible to provide an optical fiber whose bending loss of the fundamental mode is decreased to not more than 0.3 dB per 100 wire turns (the bend radius is 30 mm) when, for example, the wavelength λ is 1550 nm. That is, it is possible to provide an optical fiber that meets the bending loss condition (in which the bending loss, generated when the bend radius is 30 mm, is not more than 0.5 dB per 100 wire turns) which ITU-T656 recommends.

(b) of FIG. 10 is a graph showing a wavelength dependency of each of a confinement loss (indicated by a solid line) and a bending loss (indicated by a dashed line) of a higher order mode (a first higher order mode or an LP 11 mode) of the optical fiber 10' having a first clad region 12' to which fluorine is added so that a relative refractive index difference Δ becomes −0.2%. The graph of (b) of FIG. 10 shows results obtained by calculating bending losses and confinement losses generated when (I) hole intervals Λ is 15.0 μm and (II) a ratio d/Λ of a hole diameter d to hole intervals Λ is 0.5.

As is clear from (b) of FIG. 10, a confinement loss and a bending loss of the higher order mode of the optical fiber 10' is approximately 1 dB/m in the S through L bands (in the wavelength band between 1460 nm and 1625 nm). That is, by employing a configuration in which fluorine is added to the first clad region 12' so that the relative refractive index difference Δ becomes −0.2%, it is possible to provide a single mode transmittable optical fiber that substantially meets, in the S through L bands, the single mode condition (in which the bending loss, generated when the bend radius is 140 mm, is not less than 1 dB/m=10$^3$ dB/km) disclosed in Non-Patent Literature 2.

[Summary]

An optical fiber of the present invention is an optical fiber, having a cross sectional configuration having a core region, a first clad region arranged around the core region, and a second clad region arranged around the first clad region, each of the first clad region and the second clad region having holes which have identical diameters and are periodically formed so that the first clad region and the second clad region each have an effective refractive index lower than a refractive index of the core region, and the effective refractive index of the first clad region being lower than that of the second clad region.

According to the configuration, the clad regions (the first clad region and the second clad region), in each of which the holes are periodically formed, are arranged around the core region. This causes the optical fiber to confine light by means of total reflection, as with a conventional photonic crystal fiber. Therefore, the optical fiber can (i) carry out a single mode transmission at a broader wavelength band as with the conventional photonic crystal fiber and (ii) have a small bending loss. The optical fiber can also have an effective area greater than that of the conventional photonic crystal fiber having a step-index effective refractive index profile (see (b) of FIG. 11) since the effective refractive index of the first clad region is lower than that of the second clad region in the optical fiber of the present invention.

Further, according to the configuration, the holes of the first clad region are identical in diameter to those of the second clad region. Therefore, the optical fiber can be easily produced as compared with an optical fiber whose effective area is increased by forming holes in a first clad region so as to have a diameter different from that of holes formed in a second clad region.

Therefore, according to the configuration, it is possible to provide an optical fiber which (i) has an effective area greater than that of the conventional photonic crystal fiber and (ii) can be easily produced while (a) being capable of carrying out a single mode transmission as with the conventional photonic crystal fiber and (b) having a small bending loss.

Note that what is meant by "holes . . . being periodically formed" is that the holes are arranged periodically enough for the optical fiber, in which the holes are formed, to function as a photonic crystal fiber. Note also that what is meant by the holes of the first clad region being "identical" in diameter to those of the second clad region is that a diameter difference between the holes of the first clad region and the holes of the second clad region is smaller than a manufacturing tolerance.

In the optical fiber of the present invention, the effective refractive index of the first clad region can be decreased more than that of the second clad region by, for example, (i) increasing a number density of the holes of the first clad region more than that of the holes of the second clad region, (ii) adding a dopant to the first clad region so as to decrease the effective refractive index of the first clad region, or (iii) employing (i) and (ii) in combination. In a case where the effective refractive index of the first clad region is decreased more than that of the second clad region by increasing the number density of the holes of the first clad region more than that of the holes of the second clad region, the optical fiber can have a further lower loss without any loss caused by scattering of a dopant. This is because it is unnecessary to add the dopant.

It is preferable to configure the optical fiber of the present invention such that the first clad region has M layered group(s) of holes (M is a given natural number), the second clad region has N layered group(s) of holes (N is a given natural number), a group of holes of the i-th layer, out of the M+N layered groups of holes, from the core region is made up of L×i holes arranged on a regular polygon, with L sides, in which a distance between a center and respective L apexes is $\Lambda \times i$, where L is a natural number of not less than 7 and i is a natural number of not less than 1 but not more than M, and a group of holes of the j-th layer, out of the M+N layered groups of holes, from the core region is made up of 6×j holes arranged on a regular hexagon in which a distance between a center and respective six apexes is $\Lambda \times j$, where j is a natural number of not less than M+1 but not more than M+N.

According to the configuration, the holes can be isotropically arranged in each of the first clad region and the second clad region. Further, the number density of the holes of the first clad region can be increased more than that of the holes of the second clad region while the holes are arranged, in a close-packed manner, in the second clad region 13.

It is preferable to configure the optical fiber of the present invention such that the group of holes of the i-th layer is made up of 8×i holes arranged on a regular octagon in which a distance between a center and respective eight apexes is $\Lambda \times i$.

According to the configuration, it is possible to provide an optical fiber that meets both (i) the bending loss condition (in which the bending loss of a fundamental mode, generated when a bend radius is 30 mm, is not more than 0.5 dB per 100 wire turns) which ITU-T656 recommends and (ii) the single mode condition (in which the bending loss of a higher order mode is not less than 1 dB/m=$10^3$ dB/km when a bend radius is 140 mm) described in Non-Patent Literature 2. Such a further effect can be brought about by adjusting as appropriate (a) a diameter of holes in the optical fiber and (b) a center distance $\Lambda$ between any adjacent holes in a second clad region of the optical fiber.

It is preferable to configure the optical fiber of the present invention such that any adjacent holes in the second clad region have a center distance $\Lambda$ of not more than 15.6 μm.

According to the configuration, it is possible to provide an optical fiber that meets both (i) the single mode condition (in which the bending loss of the higher order mode, generated when the bend radius is 140 mm, is not less than 1 dB/m=$10^3$ dB/km) described in Non-Patent Literature 2 and (ii) the bending loss condition (in which the bending loss of the fundamental mode, generated when the bend radius is 30 mm, is not more than 0.5 dB per 100 wire turns) which ITU-T656 recommends. Such a further effect can be brought about by appropriately setting the diameter of the holes.

It is preferable to configure the optical fiber of the present invention such that any adjacent holes in the second clad region have a center distance $\Lambda$ of not less than 12.6 μm.

According to the configuration, it is possible to obtain an effective area of not less than 160 μm² which is the limit effective area of a conventional optical fiber.

It is preferable to configure the optical fiber of the present invention such that a ratio d/$\Lambda$ of a diameter d of the holes in the second clad region to a center distance $\Lambda$ of any adjacent holes in the second clad region is not more than 0.521.

According to the configuration, it is possible to provide an optical fiber that meets both (i) the bending loss condition (in which the bending loss of the fundamental mode, generated when the bend radius is 30 mm, is not more than 0.5 dB per 100 wire turns) which ITU-T656 recommends and (ii) the single mode condition (in which the bending loss of the higher order mode, generated when the bend radius is 140 mm, is not less than 1 dB/m=$10^3$ dB/km) described in Non-Patent Literature 2. Such a further effect can be brought about by appropriately setting the center distance $\Lambda$ of any adjacent holes in the second clad region.

The optical fiber of the present invention can be expressed as an optical fiber, having a cross sectional configuration having a core region, a first clad region arranged around the core region, and a second clad region arranged around the first clad region, the first clad region and the second clad region having first holes and second holes, respectively, formed periodically so that first and second effective refractive indices of the respective first and second clad regions are lower than a refractive index of the core region, and a first occupied ratio of the first holes to a cross-sectional area of the first clad region being higher than a second occupied ratio of the second holes to a cross-sectional area of the second clad region so that the first clad region has an effective refractive index lower than that of the second clad region.

According to the configuration, the clad regions (the first clad region and the second clad region), in which the respective first and second holes are periodically formed, are arranged around the core region. This causes the optical fiber to confine light by means of total reflection, as with a conventional photonic crystal fiber. Therefore, the optical fiber can (i) carry out a single mode transmission at a broader wavelength band as with the conventional photonic crystal fiber and (ii) have a small bending loss. The optical fiber can also have an effective area greater than that of the conventional photonic crystal fiber having a step-index effective refractive index profile since the effective refractive index of the first clad region is lower than that of the second clad region in the optical fiber of the present invention.

Further, according to the configuration, the first occupied ratio of the first holes to the cross-sectional area of the first clad region is higher than the second occupied ratio of the second holes to the cross-sectional area of the second clad region so that the first clad region has the effective refractive index lower than that of the second clad region. It is therefore unnecessary to form the first holes in the first clad region so as to have a diameter different from that of the second holes formed in the second clad region so that the effective refractive index of the first clad region is lower than that of the second clad region. Hence, the optical fiber of the present invention can be produced more easily than an optical fiber in which holes are formed in a first clad region so as to have a diameter different from that of holes formed in a second clad region so that an effective refractive index of the first clad region becomes lower than that of the second clad region.

According to the configuration, it is therefore possible to provide an optical fiber which (i) has an effective area greater than that of the conventional photonic crystal fiber and (ii) can be easily produced while (a) being capable of carrying out a single mode transmission as with the conventional photonic crystal fiber and (b) having a small bending loss.

The optical fiber of the present invention can be expressed as an optical fiber, having a cross sectional configuration having a core region, a first clad region arranged around the core region, and a second clad region arranged around the first clad region, the first clad region and the second clad region having first holes and second holes, respectively, formed periodically so that first and second effective refractive indices of the respective first and second clad regions are lower than a refractive index of the core region, and the first holes are different from the second holes in number density so that the first clad region has an effective refractive index lower than that of the second clad region.

According to the configuration, the clad regions (the first clad region and the second clad region), in which the respective first and second holes are periodically formed, are arranged around the core region. This causes the optical fiber to confine light by means of total reflection, as with a conventional photonic crystal fiber. Therefore, the optical fiber can (i) carry out a single mode transmission at a broader wavelength band as with the conventional photonic crystal fiber and (ii) have a small bending loss. The optical fiber can also have an effective area greater than that of the conventional photonic crystal fiber having a step-index effective refractive index profile since the effective refractive index of the first clad region is lower than that of the second clad region in the optical fiber of the present invention.

Further, according to the configuration, the first holes are different from the second holes in number density so that the first clad region has an effective refractive index lower than that of the second clad region. It is therefore unnecessary to form the first holes in the first clad region so as to have a diameter different from that of the second holes formed in the second clad region so that the effective refractive index of the first clad region is lower than that of the second clad region. Hence, the optical fiber of the present invention can be produced more easily than an optical fiber in which holes are formed in a first clad region so as to have a diameter different from that of holes formed in a second clad region so that an effective refractive index of the first clad region becomes lower than that of the second clad region.

According to the configuration, it is therefore possible to provide an optical fiber which (i) has an effective area greater than that of the conventional photonic crystal fiber and (ii) can be easily produced while (a) being capable of carrying out a single mode transmission as with the conventional photonic crystal fiber and (b) having a small bending loss.

[Additional Description]

The present invention is not limited to the description of Embodiments above, and can therefore be modified by a skilled person in the art within the scope of the claims. Namely, an embodiment derived from a proper combination of technical means disclosed in different embodiments is also encompassed in the technical scope of the present invention.

Industrial Applicability

The present invention is applicable to an optical fiber employed as a transmission medium for transmitting optical signals. The present invention is suitably applicable particularly to an optical fiber for long-distance transmission.

REFERENCE SIGNS LIST

10 and 10': optical fiber
11 and 11': core region
12 and 12': first clad region
12$a$ and 12'$a$: hole
13 and 13': second clad region
13$a$ and 13'$a$: hole

The invention claimed is:

1. An optical fiber, having a cross sectional configuration having a core region, a first clad region arranged around the core region, and a second clad region arranged around the first clad region,
    each of the first clad region and the second clad region having holes which have identical diameters and are periodically formed so that the first clad region and the second clad region each have an effective refractive index lower than a refractive index of the core region,
    the first clad region having a single layered group(s) of holes, the second clad region having N layered group(s) of holes (N is a given natural number),
    a group of holes of a first layer, out of the 1+N layered groups of holes, being made up of eight holes arranged on a regular octagon, in which a distance between a center and respective eight apexes is $\Lambda$, the first layer being a layer which is closest to the core region, a group of holes of a j-th layer, out of the 1+N layered groups of holes, as counted from the first layer, being made up of 6×j holes arranged on a regular hexagon in which a distance between a center and respective six apexes is $\Lambda \times j$, where j is a natural number of not less than 2 but not more than 1+N, and
    a ratio d/$\Lambda$ of a diameter d of the holes in the second clad region to a center distance $\Lambda$ of any adjacent holes in the second clad region is not more than 0.521, wherein any adjacent holes in the second clad region have a center distance $\Lambda$ of not less than 12.6 μm; and
wherein $(0.01125/\mu m) \times \Lambda + 0.3455 \le d/\Lambda \le (0.00375/\mu m) \times \Lambda + 0.4625$.

2. The optical fiber as set forth in claim 1, wherein:
any adjacent holes in the second clad region have a center distance $\Lambda$ of not more than 15.6 μm.

3. The optical fiber as set forth in claim 1, wherein:
a dopant is added to the first clad region so as to decrease a refractive index of the first clad region.

4. The optical fiber as set forth in claim 1, wherein:
an effective area is not less than 160 μm² when a wavelength is 1550 nm,
at a wavelength of not less than 1460 nm but not more than 1625 nm, (i) a single mode transmission can be carried out, and (ii) a bending loss of a fundamental mode, generated when a bend radius is 30 mm, is not more than 0.5 dB per 100 wire turns.

\* \* \* \* \*